United States Patent [19]

Chiang

[11] Patent Number: 5,350,146
[45] Date of Patent: Sep. 27, 1994

[54] CLAMP FOR FASTENING A TRACKBALL-CONTAINING SHELL TO LAPTOP COMPUTER KEYBOARDS

[75] Inventor: Tzung-Nan Chiang, Taipei, Taiwan

[73] Assignee: Shih Yang Tso, Taipei, Taiwan

[21] Appl. No.: 52,915

[22] Filed: Apr. 27, 1993

[51] Int. Cl.$^5$ .................................. F16M 13/00
[52] U.S. Cl. ......................... 248/231.4; 248/918; 248/224.2; 248/225.31
[58] Field of Search ............... 248/225.31, 229, 231.4, 248/231.6, 316.4, 918, 224.2, 442.2; 400/715, 718, 717; 273/148 B; 340/710, 711

[56] References Cited

U.S. PATENT DOCUMENTS

| | | | |
|---|---|---|---|
| 671,486 | 4/1901 | Laumann | 248/224.2 X |
| 739,259 | 9/1903 | Hock | 400/717 X |
| 1,655,444 | 1/1928 | Tiritter | 248/225.31 |
| 3,039,728 | 6/1962 | Sova | 248/316.4 |
| 4,301,767 | 11/1981 | Willinger et al. | 248/231.4 X |
| 4,913,387 | 4/1990 | Tice | 248/918 X |
| 4,952,919 | 8/1990 | Nippoldt | 273/148 B X |
| 5,253,836 | 10/1993 | Tso | 248/225.31 |
| 5,268,675 | 12/1993 | Garthwaite et al. | 248/918 X |

FOREIGN PATENT DOCUMENTS 1090407 11/1960 Fed. Rep. of Germany ... 248/224.2

*Primary Examiner*—Karen J. Chotkowski
*Attorney, Agent, or Firm*—Sixbey, Friedman, Leedom & Ferguson

[57] ABSTRACT

A clamp for fastening a trackball-containing shell to laptop computer keyboards. The clamp has (a) a tray having a dovetail formed thereon for engaging with a dovetail slot formed in the trackball-containing shell, (b) a replaceable first clamping element having a first jaw being insertable in a clearance between keys and a margin of the keyboard, (c) a spring-biased second clamping element having a second jaw for abutting the margin and (d) a button linked to the spring-biased second clamping element. When the button is pressed, the second jaw of the spring-biased second clamping element is accordingly moved away from the first jaw of the first clamping element so that the margin can be sited therebetween. When the button is released, the first jaw of the first clamping element cooperates with the second jaw of the spring-biased second clamping element so as to clamp the margin, so that the trackball-containing shell is firmly maintained in position relative to the keyboard.

2 Claims, 4 Drawing Sheets

CLAMP FOR FASTENING A TRACKBALL-CONTAINING SHELL TO LAPTOP COMPUTER KEYBOARDS

BACKGROUND OF THE INVENTION

The present invention relates to a clamp for fastening a trackball-containing shell to laptop computer keyboards and, more particularly, to a clamp having a replaceable first clamping element cooperating with a spring-biased second clamping element for clamping to the keyboard and a button for pressing the spring-biased second clamping element with respect to the first clamping element before the use thereof.

At the time being, laptop computers are widely used to help deal with business outside offices because of their size and portability. For drawing, a laptop computer is desired to incorporate a trackball in order to move a cursor more readily on a screen. Generally, as laptop computers and trackballs are used outside offices, it is difficult to find plane surfaces to place the trackballs, especially when used in vehicles. Therefore, a trackball encompassed in a shell is usually sold with a clamp which is used for binding the shell to a keyboard, so that the trackball is maintained in a stable position relative to the keyboard.

Conventionally, a clamp bearing a shell which encompasses a trackball is secured to a keyboard with screws. The screws must be disengaged from the keyboard to release the clamp from the keyboard, so that the laptop computer, the keyboard, and the trackball can be packed in a business case more easily. It is relatively inconvenient to bring screw drivers to disengage the screws from the keyboard. Furthermore, a clamp made by a certain manufacturer usually does not fit a keyboard made by another manufacturer.

In the present inventor's co-pending U.S. patent application No. 07/882,485, a clamp is used for fastening a shell which encompasses a trackball to a keyboard of a laptop computer. The clamp has a tray having a dovetail for engaging with a dovetail slot of the shell, a replaceable first clamping element with a first jaw to be inserted in a clearance between keys and a margin of the keyboard, and a spring-biased second clamping element for abutting the margin, so that the first clamping element cooperates with the spring-biased second clamping element to clamp the margin, thereby maintaining the shell in a stable position relative to the keyboard. Although the spring-biased second clamping element and the first clamping element firmly clamp the margin, it is inconvenient to press the spring-biased second clamping element away from the first clamping element before the use thereof.

The present invention is intended to overcome the above-mentioned drawbacks.

SUMMARY OF THE INVENTION

The present invention provides a clamp for fastening a trackball-containing shell to laptop computer keyboards. The clamp has (a) a tray having a dovetail formed thereon for engaging with a dovetail slot formed in the trackball-containing shell, (b) a replaceable first clamping element having a first jaw being insertable in a clearance between keys and a margin of the keyboard, (c) a spring-biased second clamping element having a second jaw for abutting the margin and (d) a button linked to the spring-biased second clamping element. When the button is pressed, the second jaw of the spring-biased second clamping element is accordingly moved away from the first jaw of the first clamping element so that the margin can be sited therebetween. When the button is released, the first jaw of the first clamping element cooperates with the second jaw of the spring-biased second clamping element so as to clamp the margin, so that the trackball-containing shell is firmly maintained in position relative to the keyboard.

For a better understanding of the present invention and objects thereof, a study of the detailed description of the embodiments described hereinafter should be made in relation to the accompanying drawings.

DETAILED DESCRIPTION OF THE PREFERRED EMBODIMENT

The present invention will be described in detail with reference to the drawings showing the preferred embodiment of the present invention.

Figure 1:
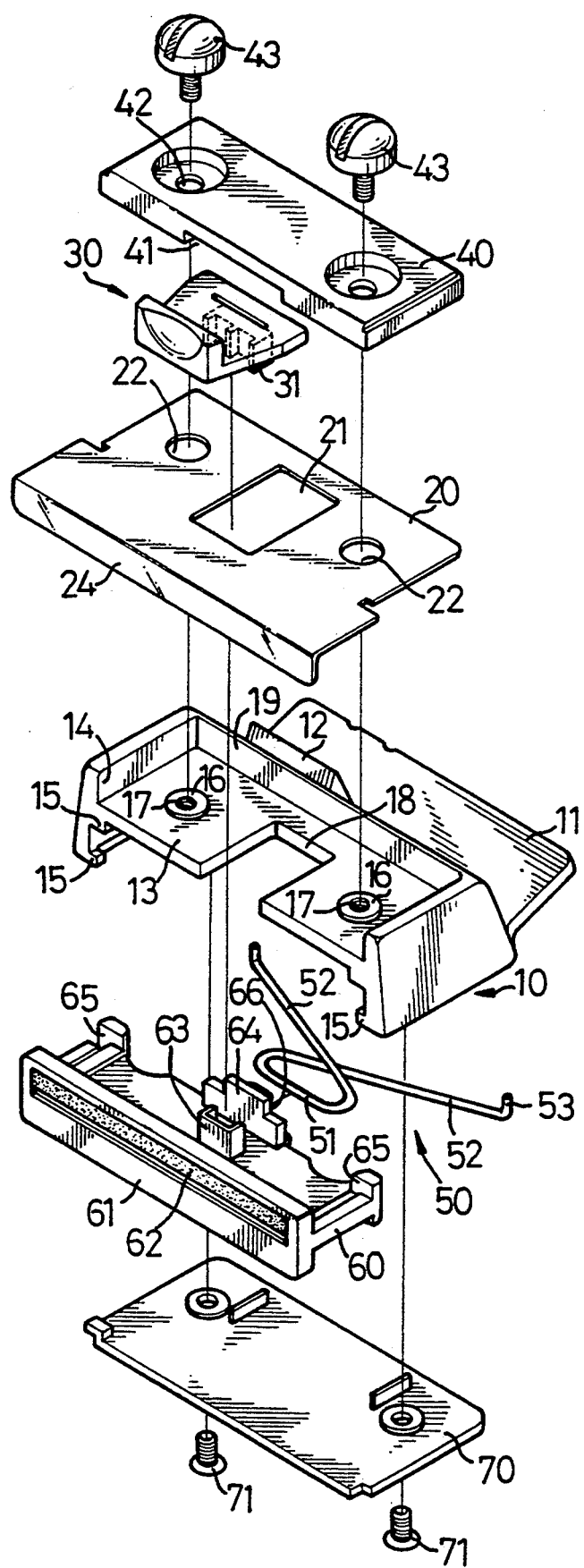
FIG. 1 is an exploded view of a clamp for fastening a trackball-containing shell to laptop computer keyboards in accordance with the present invention.

Initially referring to FIG. 1 of the drawings, in accordance with the instant invention, a clamp for fastening a trackball-containing shell to laptop computer keyboards has a tray 11 for carrying a trackball-containing shell, a replaceable first clamping element 20 with a first jaw 24 being insertable in a clearance between keys and a margin of the keyboard, a spring-biased second clamping element 60 having a second jaw 61 for abutting the margin and a button 30 linked to the spring-biased second clamping element 60.

The clamp has a base 10. The base has two opposite trapezoidal lateral walls 14 each having a first edge, a second edge, a third edge and a fourth edge. The second and fourth edges of the lateral wall 14 are parallel to each other. The first edge of the lateral wall 14 is inclined relative to the second and fourth edges of the lateral wall 14. The third edge of the lateral wall 14 is perpendicular to the second and fourth edges of the lateral wall 14. The lateral walls 14 each have a stop 15 formed thereon near the first edge of the lateral wall 14. The stop 15 formed one of the lateral walls 14 faces the stop 15 formed on the remaining of the lateral walls 14.

A front wall 19 has a first lateral edge linking to the edge 14a of one of the lateral walls 14, a second lateral edge linking to the edge 14b of the remaining of the lateral walls 14 and a lower edge linking to an edge of a tray 11. A dovetail 12 is formed on the front wall 19.

A plate 13 has a first lateral edge linking to one of the lateral walls 14 and a second lateral edge linking to the remaining of the lateral walls 14 and a front edge linking to the front wall 19. The lateral walls 14 each have two limits 15 formed thereon in positions distal from the front wall 19. The limits 15 formed on one of the lateral walls 14 face the limits formed on the remaining of the lateral walls 14. Two bosses 16 are formed on the plate 13. The bosses 16 each have a threaded hole 17 formed therein. A cutout 18 is formed in the plate 13 between the holes 17. Two spring-retaining grooves (not shown) are formed in the plate 13 near and in parallel to the front wall 19. Two cylindrical protrusions (not shown) are formed beneath the plate 13.

A spring 50 has a middle section 51 integrating with two terminal sections 52. The terminal sections 52 intersect each other. The terminal sections 52 each have a tip 53 vertically extending therefrom.

A spring-biased second clamping element consists of a plate 60 perpendicularly integrating with a second jaw 61. A plastic pad 62 is attached on the second jaw 61. An element 63 is formed on the plate 60. The element 63 has a Ushaped form (when seen in a top view). An element 64 is formed on the plate 60. The tab has a first side facing the element 63 and a second surface opposite to the first side. Two ribs 66 are formed on the second surface of the tab 64. Two anchors 65 are formed on the corners of the plate 60.

A bottom plate 70 has a form corresponding to a space defined by means of lower edges of the lateral walls 14 and front wall 19. Two holes are formed in the bottom plate 70, corresponding to the cylindrical protrusions formed beneath the plate 13.

Figure 2:
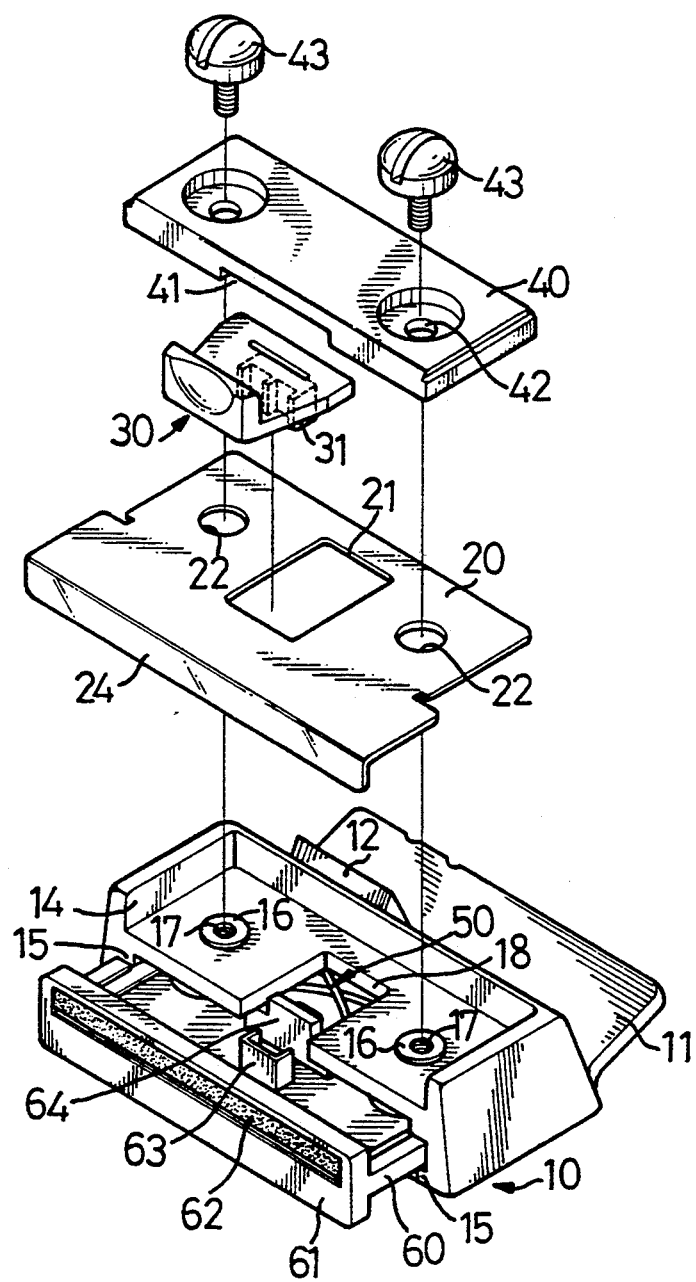
FIG. 2 is a partially exploded view of a clamp for fastening a trackball-containing shell to laptop computer keyboards in accordance with the present invention.

Additionally referring to FIG. 2 of the drawings, in assembly, the ends of the spring 50 are respectively sited in the spring-retaining grooves formed in the plate 13. The middle section 51 is sited between the spring-retaining ribs 66. The plate 60 is sited below the plate 13 between the lateral walls 14. The spring 50 is apt to bias the spring-biased second clamping element out of the base 10. The spring-biased second clamping element will not be pushed out of the base 10 as the anchors 65 are trapped by means of the tabs 15. The element 63 and the element 64 are sited in the cutout 18. The plate 70 is sited beneath the base 10. Two screws 71 are inserted through the holes formed in the bottom plate 70 in order to be secured in the cylindrical protrusions formed beneath the plate 13.

Further referring to FIG. 1 of the drawings, the first clamping element 20 has an opening 21 formed therein and two holes 22 formed therein beside the opening 21. The opening 21 is corresponding to the cutout 18 and the holes 22 are corresponding to the holes 17. The first clamping element 20 further has a first jaw 24. The dimension of the first clamping element 20 is variable for matching that of the margins of keyboards.

A button 30 perpendicularly integrating with a plate beneath which a pushing portion 31 is formed. The pushing portion 31 has a substantially m-shaped form when seen in a top view.

A top plate 40 has a recess 41 formed therebeneath and therein and two counter bores 42 formed therein. The recess 41 receives the plate which integrates with the button 30. The counter bores 42 are corresponding to the holes 22.

Figure 3:
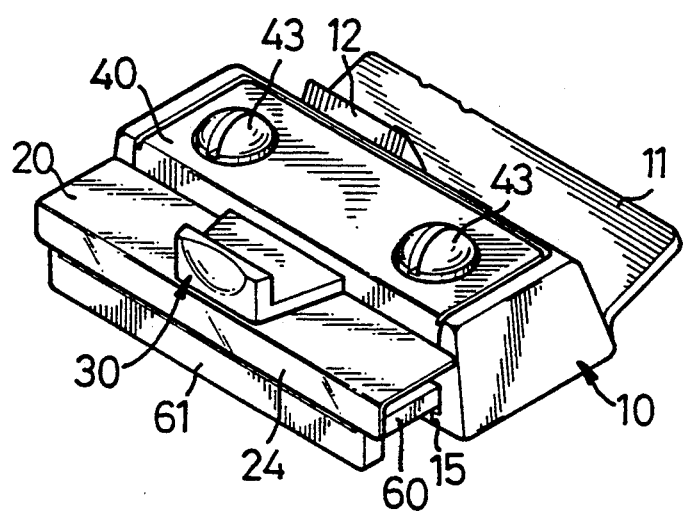
FIG. 3 is a perspective view of a clamp for fastening a trackball-containing shell to laptop computer keyboards in accordance with the present invention.

Additionally referring to FIG. 3, the buckle element 20 is mounted on the plate. The bosses 16 are received in the holes 22. The cutout 18 aligns with the opening 21. The button 30 is sited on the first clamping element 20. The pushing portion 31 projects through the opening 21 and the cutout 18 so as to engage with the element 63. The top plate 40 is mounted on the first clamping element 20. The plate integrating with the button 30 is sited in the recess 41. Two threaded bolts 43 are inserted through the counter bores 42 and the holes 22 in order to be secured in the threaded holes 17.

Figure 4:
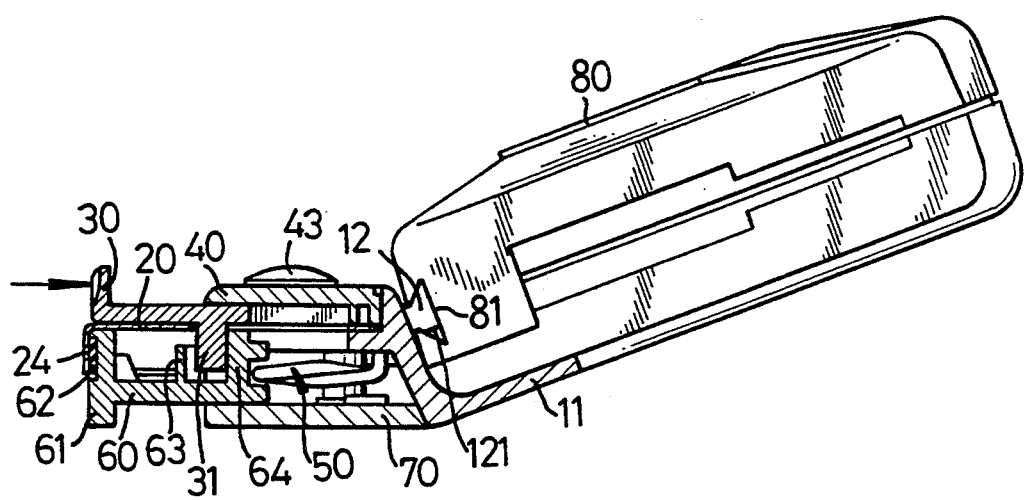
FIG. 4 is a vertical cross-sectional view of a clamp for fastening a trackball-containing shell to laptop computer keyboards in accordance with the present invention, before clamping one of the keyboards.

Additionally referring to FIG. 4, a trackball-containing shell 80 has a dovetail slot 81. The trackball-containing shell 80 is mounted on the tray 11. The dovetail 12 engages with the dovetail slot 81. Thus, the clamp is linked to the trackball-containing shell 80.

The spring 50 biases the spring-biased second clamping element 60 toward the first clamping element 20. The second jaw 61 is biased to contact the first jaw 24 and the element 64 is biased to contact the pushing portion 31.

Figure 5:
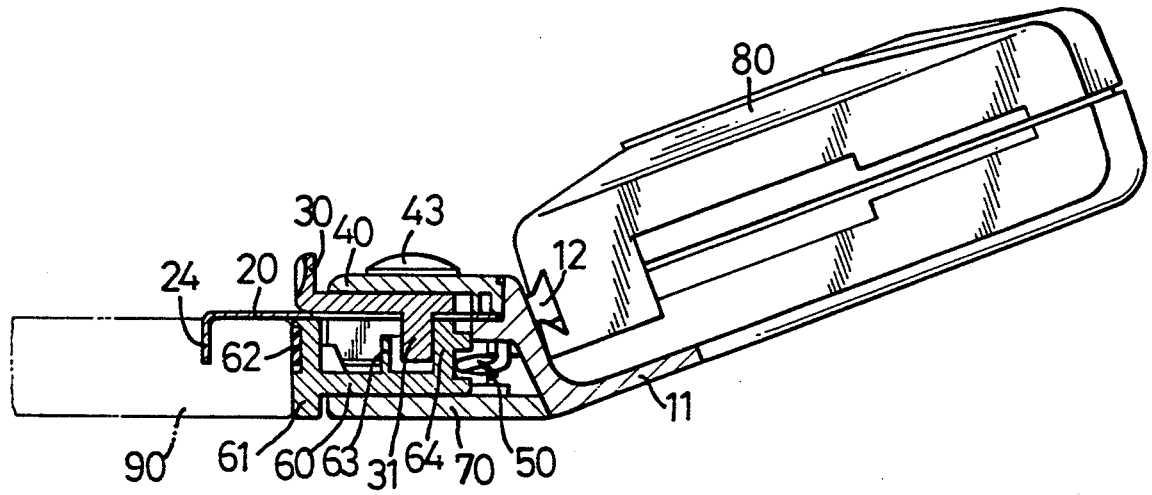
FIG. 5 is vertical cross-sectional view of a clamp for fastening a trackball-containing shell to laptop computer keyboards in accordance with the present invention, clamping one of the keyboards.

Additionally referring to FIG. 5, a laptop computer keyboard 90 is shown in phantom line. When the button 30 is pressed as indicated with an arrow in FIG. 4, the pushing portion 31 moves the spring-biased second clamping element to a position shown in FIG. 5. A margin of the keyboard 90 is sited between the first jaw 24 and the second jaw 61. When the button 30 is released, the margin of the keyboard 90 is firmly clamped by means of the first jaw 24 and the second jaw 61 as the spring-biased second clamping element 60 is biased toward the first clamping element 20 by means of the spring 50. Thus, the trackball-containing shell 80 is fastened to the keyboard 90.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A clamp for fastening a trackball-containing shell to a keyboard, comprising:

a base comprising (a) a plate comprising first, second, third and fourth edges, upper and lower surfaces, two first threaded holes formed through said upper surface thereof, two second threaded holes formed in said lower surface thereof and a cutout formed therein between said first threaded holes and between said second threaded holes, (b) two walls formed along said second and fourth edges of said plate thereof, (c) a wall formed along said third edge of said plate thereof, said walls formed along said second and fourth edges of said plate thereof respectively comprising two limits formed thereon facing each other and (d) a tray formed on said wall formed along said third edge of said plate thereof for carrying the trackball-containing shell;

a first clamping element comprising a first jaw perpendicularly connecting therewith, two holes formed therein and an opening formed therein between said holes, said first clamping element being sited on said plate of said base;

a button comprising upper and lower surfaces and a pushing portion formed on said lower surface thereof, said button being sited on said first clamping element with said pushing portion inserted through said opening formed in said first clamping element and said cutout formed in said plate of said base;

a top plate comprising two holes formed therein, said top plate being sited on said button;

two threaded bolts inserted through said holes formed in said top plate and said first clamping element for being engaged in said first threaded holes so that said first clamping element is attached to said base and that said button is mounted between said first clamping element and said top plate;

a second clamping element comprising first, second, third and fourth edges, upper and lower surfaces, a second jaw perpendicularly formed along said first edge thereof and two anchors formed along said third edge thereof, said second clamping element being sited below said plate of said base between said walls formed along said second and fourth edges of said plate of said base;

a spring comprising a middle section and two terminal sections, said middle section of said spring being sited against said third edges of said plate of said base and said terminal sections of said spring being sited against said wall formed along said third edge of said plate of said base so that said second jaw is biased toward said first jaw by means of said spring;

a bottom plate comprising two holes formed therein, said bottom plate being sited below said second clamping element; and two threaded bolts being inserted through said holes formed in said bottom plate for being engaged in said second threaded holes.

2. A clamp in accordance with claim 1, further comprising a dove for engaging with a dovetail slot formed in the trackball-containing shell.

* * * * *